Sept. 19, 1961         H. PIETZSCH         3,001,164
ROTATABLE BASE FOR FLUORESCENT LAMPS
Filed May 12, 1958
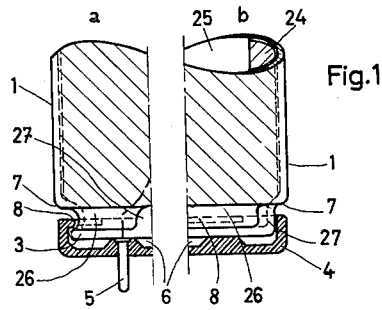
Fig.1
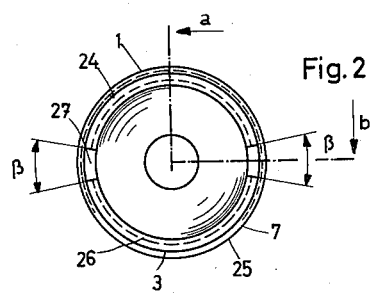
Fig.2
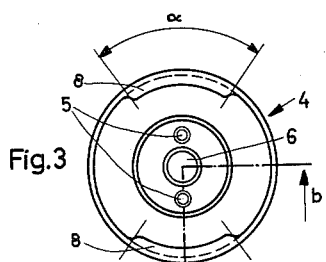
Fig.3
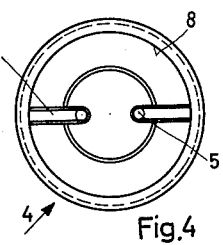
Fig.4
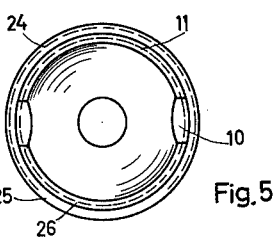
Fig.5
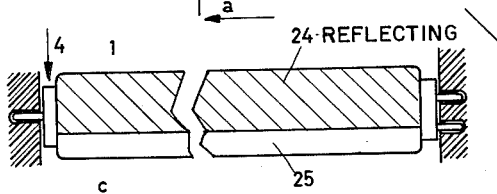
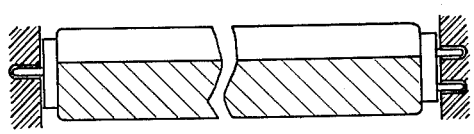
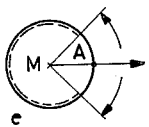
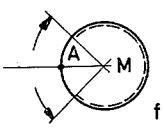
Fig.6        Fig.7
INVENTOR.
*Robert Pietzsch*

United States Patent Office 3,001,164
Patented Sept. 19, 1961

3,001,164
ROTATABLE BASE FOR FLUORESCENT LAMPS
Herbert Pietzsch, Berlin, Germany, assignor to Patent-Treuhand-Gesellschaft für elektrische Glühlampen m.b.H., Munich, Germany
Filed May 12, 1958, Ser. No. 734,809
Claims priority, application Germany May 17, 1957
7 Claims. (Cl. 339—2)

The present invention relates to bases for electric lamps and similar devices and particularly for double-ended electric discharge lamps of the fluorescent type having a bi-pin base at each end.

In the copending application Pietzsch et al., Ser. No. 648,135, filed March 25, 1957 and assigned to the assignee of the present application, a cap-shaped base is disclosed and claimed which is made of plastics, preferably translucent material. This material may also be opaque or coloured or have embedded therein luminescent materials or pigments. It should have an elasticity modulus of at least 5000 kg./cm.$^2$, a breaking tension of more than 50% and should begin to soften at a temperature of at least 150° C. Plastics known under the trademark "Ultramid S" (manufactured by BASF, Ludwigshafen a. Rhein, Germany) or "Durethan E20" (manufactured by Farbenfabriken Bayer A.G., Leverkusen, Germany) show these properties.

Cap-shaped bases of the mentioned plastic materials have been designed in such a manner that the cap-shaped base on the hollow cylindrical part at its free rim is provided with an inwardly extending angular flange fitting into a recess which is formed by the thickening on the stem seal at the cylindrical tube neck. Because of its great elasticity modulus this base may be pressed without special heating at room temperature onto the tube neck and is designed in such a manner that it adheres fast to the tube neck without use of any cement.

By the angular flange the base is prevented from slipping off the neck of the tube. Strength of base and envelope against distortions is given by means of one or several transverse ribs in the disk-shaped part of the base which ribs fit into corresponding transverse notches of the tube neck rim.

It is desirable, however, especially when utilizing lamps with irregular light radiation, to enable turning of the lamp against the base for the purpose of adjusting the lamp on assembly or during operation. That is, for instance, the case with lamps which radiate light in different colours into different directions because of unequal filtering or luminescent layers on the tube wall or which have a reflecting inner coating on a part of the envelope extending in longitudinal direction of the tube. By turning envelope and base against each other radiation may be directed into any desired direction with one of the desired colours or the light emitting window of the reflector lamp may be directed in the aforesaid manner.

There are already known special sockets and bases enabling turning of the lamp. In these latter constructions, however, a base part is always provided which is tightly connected with the lamp and twisting is made possible by additional means, especially by intermediate parts. In case of generally used lamp types these well known turnable sockets or bases require alterations in existing fixtures and sockets or, if generally used sockets and fixtures are employed they require new lamp types with shorter tube length because these socket and base constructions require more space than ordinary unturnable holding devices.

Against the above mentioned types this invention shows the advantage that it is much simpler and that it makes possible use of lamps dimensioned in usual manner in ordinary fixtures and sockets. This may be effected in such a manner that no intermediate parts are necessary but the base itself is put onto the lamp bulb neck where it may be twisted.

It is the object of the present invention to provide a new and improved base of elastic insulating material for electric lamps and similar devices.

It is another object to provide the base of elastic insulating material in such a manner that it can be turned or twisted within a restricted angle on the cylindrical end of the lamp envelope.

It is a further object of the invention to limit the turnability of the base, which has on the hollow cylindrical part of its free rim inwardly extending angular flange parts and engaging into recesses formed at the cylindrical end of the lamp envelope, by providing on its disk-shaped part at least one inner rib engaging with corresponding but broader transverse notches of the tube neck.

It is another object of the invention to limit the turnability by providing angular flange parts extending over parts of the base circumference and abutting with its ends upon lugs in the lamp neck recess.

Further advantages of the invention will appear from the following detailed description of species thereof. For better understanding of the invention reference may be made to the following description taken in connection with the accompanying drawings and its scope will be pointed out in the appended claims:

FIGS. 1a and 1b show cross sections in two planes vertically to each other through the end of a fluorescent lamp provided with the turnable base.

FIG. 2 shows in elevational view an unbased discharge lamp in direction of the tube axis.

FIG. 3 is an elevational view of a base provided with angular flange segments.

FIG. 4 shows a base with inner transverse ribs in elevational view and

FIG. 5 shows a view in axial direction of the tube of a discharge lamp fitting into the base shown in FIG. 4.

FIGS. 6c to 6f show a lamp with reflecting inner coating in side view which is inserted in four different positions into sockets arranged in a staggered manner and shown schematically in section.

FIGS. 7c to 7f show in cross section a reflector lamp in similar positions as shown in FIGS. 6c to 6f.

The discharge lamp represented in FIGS. 1a, 1b and 2 is coated on the inner side of tube 1 with a reflecting layer 24 (in the drawing represented by dots) extending in longitudinal direction of the tube over about two thirds of the tube circumference and leaving uncovered the light emitting window 25. The total inner wall of the tube may, furthermore, be coated with a luminescent layer which covers the reflecting layer. By means of the thickened stem seal 3 and the shoulder 7 a recess 26 is formed on the lamp envelope with which the angular base flange 8 engages as it is represented in FIG. 1. Two oppositely arranged lugs 27 are provided for in the groove 26 each of which lugs takes an angle range β of about 20°. These lugs are formed by the glass of the lamp neck and have been blown out on forming the stem seal.

The base disk of the cap-shaped base 4 projects inward near the base pins 5, and in the middle of the disk part at 6 space is left for the exhaust tube end. Such a base fits into any generally used socket made for reception of two pins. The base 4 is provided on its free portions with two opposite inturned ribs or flange parts 8 extending over an angle range α each of about 70°.

The base is pressed on the lamp end at room temperature without or with a little preheating up to about 100° C. If starting from a normal position of base and lamp to each other in which the sectional plane $a$ shown in FIG. 2 covers the sectional plane $a$ shown in FIG. 3, likewise both the sectional planes $b$ shown in FIGS. 2 and 3, then the represented arrangement and designing of reinforcements and lugs make possible torsions in two directions of base and tube neck against each other by 45°.

Instead of two flange parts and two lugs there may be provided, of course, also more than two flange parts and lugs. The lugs 27 may consist instead of glass also of any desired cement. In case turnability of the lamp is required only for assembly in order to bring the light emitting window into a desired position in which it remains afterwards, it is suitable to use lugs which are made from a cement which softens at operating temperature of the lamp. This cement material softening at high temperatures is arranged between the base and the tube neck in such a manner that it adheres to one of the two parts. After mounting of the lamp onto the fixture and adjustment to the desired direction of radiation the cement firmly combines base and tube neck. Thereby the lamp is kept in the determined position. The lugs 27 may be made also from the same plastics as the base by heating them up to softening and pressing them into the recess. After cooling down the synthetic lug adheres very fast to the glass.

In such cases in which base and lamp shall be turned against each other only within a small angle range, the example shown in FIGS. 4 and 5 proves suitable. The cap-shaped base 4 provided with an uninterrupted flange 8 has two narrow inner transverse ribs 9 on its disk-shaped portion which ribs are intended to engage with the transverse notches 10 of the tube neck rim 11 shown in FIG. 5. These transverse notches have been already formed on stem sealing and are broader than the transverse ribs 9 so that twisting of base and lamp envelope against each other is made possible within a small angle range.

In the examples described hitherto the other lamp end, not shown, is designed in the same manner as that represented in the drawings, that means in case of two lugs on each lamp end that all the four lugs lie in the same plane.

If it is desired that user may adjust the light emitting window of the lamp in any desired direction of the room, then a further embodiment of the holding device according to the present invention is proposed in which the sockets provided for both the lamp ends are staggered against each other by 90° with regard to the planes passing through both the contact pins in each socket. Each lug on one lamp end is, accordingly, staggered by 90° against the corresponding lug on the other lamp end. Then the based lamp may be inserted into the sockets in four different positions and may be turned by 45° each in every position into both directions. FIGS. 6 and 7 show schematically all these possibilities of adjustment in a reflector lamp. The position of the lamp shown in FIG. 6d follows from that represented in FIG. 6c in such a manner that the lamp is taken out of the socket, is turned round its axis by 180° and is inserted again into the socket. The lamp ends shown in FIG. 6e are interchanged against those shown in FIG. 6d. FIG. 6f follows from that shown in FIG. 6e by turning the lamp round its axis by 180°. FIGS. 7c to 7f show in lamp cross sections the positions of the main direction of radiation MA which corresponds to the adjustments shown in FIGS. 6c to 6f. The lamp may be turned out of every of the represented positions toward both directions by 45° each. FIGS. 7c to 7f show by means of arrows the corresponding angle range for the main direction of radiation MA.

In order to prevent short circuiting the current in-leads extending within the base from the base pins to the stem seal are insultaed against each other in all examples. It is suitable to provide an insulating cover for at least one of the leading-in wires.

What I claim as new and desire to secure by Letters Patent of the United States is:

1. A fluorescent lamp with irregularly distributed light radiation and a rotatable base of elastic material secured thereto, characterized in that said base comprises a cylindrical shell with a circular disk part bearing the electrical contacting means outside the center of the disk, said cylindrical shell provided at its free rim with an inwardly extending angular flange engaging into a corresponding annular recess formed at the cylindrical end of the lamp envelope, said base having on its disk part at least one inner transverse rib engaging with corresponding but broader transverse notches at the end of the lamp envelope limiting the relative rotatability of said base and said lamp.

2. A fluorescent lamp with irregularly distributed light radiation and a rotatable base of elastic material secured thereto, characterized in that said base comprises a cylindrical shell with a circular disk part bearing the electrical contacting means outside the center of the disk, said contacting means being connected to the current lead-in wires, the cylindrical shell provided at its free rim with an inwardly extending angular flange engaging into a corresponding annular recess formed at the cylindrical end of the lamp envelope, said base having on its disk part at least one inner transverse rib engaging with corresponding but broader transverse notches of the end of the lamp envelope.

3. A fluorescent lamp with irregularly distributed light radiation and a rotatable base of elastic material secured thereto, characterized in that said base comprises a cylindrical shell with a circular disk part bearing the electrical contacting means outside the center of the disk, said cylindrical shell provided at its free rim with an inwardly extending angular flange engaging into a corresponding annular recess formed at the cylindrical end of the lamp envelope, said flange and said recess extending only over parts of the circumference enabling twisting of said base and said cylindrical end of the lamp envelope against each other within a restricted angle.

4. A fluorescent lamp with irregularly distributed light radiation and a rotatable base of elastic material secured thereto, characterized in that said base comprises a cylindrical shell with a circular disk part bearing the electrical contacting means outside the center of the disk, said cylindrical shell provided at its free rim with inwardly extending angular flanges engaging into a corresponding annular recess formed at the cylindrical end of the lamp envelope, said flanges extending only over parts of the circumference and abutting with their ends against lugs in the recess enabling twisting of said base and said cylindrical end of the lamp envelope against each other within a restricted angle.

5. A fluorescent lamp with irregularly distributed light radiation and a rotatable base of elastic material secured thereto, characterized in that said base comprises a cylindrical shell with a circular disk part bearing the electrical contacting means outside the center of the disk, said cylindrical shell provided at its free rim with inwardly extending angular flanges engaging into a corresponding annular recess formed at the cylindrical end of the lamp envelope, said flanges extending only over parts of the circumference and abutting with their ends against lugs in the recess enabling twisting of said base and said cylindrical end of the lamp envelope against each other within an angle not greater than 90°.

6. A fluorescent lamp with irregularly distributed light radiation and a rotatable base of elastic material secured thereto, characterized in that said base comprises a cylindrical shell with a circular disk part bearing the electrical contacting means outside the center of the disk, said cylindrical shell provided at its free rim with two opposite inwardly extending angular flange parts extending over an angle each of about 70°, whereby the ends of said flanges abut against two opposite lugs in the recess, each of which takes an angle of about 20° enabling twisting of the base and the cylindrical end of the lamp envelope against each other.

7. A fluorescent lamp with irregularly distributed light radiation and a rotatable base of elastic material secured thereto, characterized in that said base comprises a cylindrical shell with a circular disk part bearing the electrical contacting means outside the center of the disk, said contacting means being connected to the current lead-in wires, the cylindrical shell provided at its free rim with inwardly extending angular flanges engaging into a corresponding annular recess formed at the cylindrical end of the lamp envelope, said flanges extending only over parts of the circumference and abutting with their ends against lugs in the recess enabling twisting of the base and the cylindrical end of the lamp envelope against each other within a restricted angle.

References Cited in the file of this patent

UNITED STATES PATENTS

| | | |
|---|---|---|
| 1,970,968 | McCloy et al. | Aug. 21, 1934 |
| 1,981,458 | McCloy et al. | Nov. 20, 1934 |
| 2,268,700 | Criger et al. | Jan. 6, 1942 |
| 2,385,340 | Baxter | Sept. 25, 1945 |
| 2,864,067 | Grovemiller et al. | Dec. 9, 1958 |

FOREIGN PATENTS

| | | |
|---|---|---|
| 200,933 | Australia | Feb. 15, 1956 |